United States Patent
Kim

(10) Patent No.: US 12,188,808 B2
(45) Date of Patent: Jan. 7, 2025

(54) FREIGHT WEIGHT ESTIMATING APPARATUS AND METHOD

(71) Applicants: HYUNDAI MOTOR COMPANY, Seoul (KR); KIA CORPORATION, Seoul (KR)

(72) Inventor: Keunjin Kim, Seongnam-si (KR)

(73) Assignees: Hyundai Motor Company, Seoul (KR); KIA Corporation, Seoul (KR)

( * ) Notice: Subject to any disclaimer, the term of this patent is extended or adjusted under 35 U.S.C. 154(b) by 374 days.

(21) Appl. No.: 17/752,233

(22) Filed: May 24, 2022

(65) Prior Publication Data

US 2023/0015990 A1 Jan. 19, 2023

(30) Foreign Application Priority Data

Jul. 15, 2021 (KR) .......................... 10-2021-0092682

(51) Int. Cl.
*G01G 19/10* (2006.01)
(52) U.S. Cl.
CPC .................................. *G01G 19/10* (2013.01)
(58) Field of Classification Search
CPC ........ G01G 19/10; G01G 19/08; G01G 19/12; G01G 23/18; B60C 23/04; B60C 23/0408
USPC .......................................................... 177/1
See application file for complete search history.

(56) References Cited

U.S. PATENT DOCUMENTS

| | | | | |
|---|---|---|---|---|
| 5,780,783 | A * | 7/1998 | Heider | G01G 5/006 177/137 |
| 9,139,090 | B1 * | 9/2015 | Huang | B60W 40/13 |
| 9,170,090 | B2 * | 10/2015 | Hansen | G01B 11/026 |
| 9,174,500 | B2 * | 11/2015 | Won | B60C 23/0498 |
| 9,505,502 | B2 * | 11/2016 | Miller | B60C 23/0408 |
| 10,189,319 | B2 * | 1/2019 | Fu | B60C 23/0488 |
| 10,245,906 | B2 * | 4/2019 | Singh | G01M 17/02 |
| 10,352,758 | B2 * | 7/2019 | Ham | G01G 19/08 |
| 11,298,991 | B2 * | 4/2022 | Singh | B60C 23/04 |
| 11,535,068 | B2 * | 12/2022 | Wilson | B60G 17/052 |
| 11,833,862 | B2 * | 12/2023 | Suzuki | G01L 5/00 |

OTHER PUBLICATIONS

Jakub Polasik, et al., "Experimental Studies of the Size Contact Area of a Summer Tire as a Function of Pressure and the Load," ScienceDirect, Procedia Engineering 177 (2017) 347-351.

\* cited by examiner

*Primary Examiner* — Jacques M Saint Surin
(74) *Attorney, Agent, or Firm* — MCDONNELL BOEHNEN HULBERT & BERGHOFF LLP

(57) ABSTRACT

A freight weight estimating apparatus includes a TPMS sensor that measures air pressure of a tire, and a controller that calculates a first tread area of the tire from a first air pressure of the tire measured by the TPMS sensor before loading freight, calculates a second tread area of the tire from a second air pressure of the tire measured by the TPMS sensor after loading the freight, and estimates a weight of the freight loaded in a vehicle based on the first tread area and the second tread area.

4 Claims, 3 Drawing Sheets

FIG. 3

| | | 0 | 50 | 100 | 150 | 200 | 250 | 300 | 350 | 400 | 450 | 500 |
|---|---|---|---|---|---|---|---|---|---|---|---|---|
| | | | | | | Weight [kg] | | | | | | |
| Tread area [cm²] | | | 20.60 | 38.10 | 58.85 | 86.78 | 95.30 | 116.15 | 133.15 | 143.86 | 159.56 | 171.56 |
| Air pressure [bar] | 1.0 | 1.0243 | 1.0505 | 1.0760 | 1.0991 | 1.1253 | 1.1511 | 1.1774 | 1.2052 | 1.2334 | 1.0291 |
| Tread area [cm²] | | | 17.02 | 30.00 | 44.82 | 58.97 | 72.80 | 85.44 | 98.78 | 111.65 | 125.73 | 137.32 |
| Air pressure [bar] | 1.5 | 1.5294 | 1.5627 | 1.5962 | 1.6301 | 1.6644 | 1.6995 | 1.7350 | 1.7708 | 1.8066 | 1.8430 |
| Tread area [cm²] | | | 15.60 | 26.71 | 38.31 | 50.74 | 62.87 | 74.18 | 86.91 | 96.77 | 106.81 | 117.34 |
| Air pressure [bar] | 2.0 | 2.0321 | 2.0695 | 2.1086 | 2.1481 | 2.1878 | 2.2283 | 2.2685 | 2.3099 | 2.3520 | 2.3946 |
| Tread area [cm²] | | | 14.35 | 24.24 | 35.22 | 45.23 | 55.15 | 65.15 | 74.25 | 85.01 | 93.47 | 99.92 |
| Air pressure [bar] | 2.5 | 2.5348 | 2.5761 | 2.6187 | 2.6629 | 2.7082 | 2.7543 | 2.8014 | 2.8485 | 2.8966 | 2.9467 |
| Tread area [cm²] | | | 13.14 | 22.29 | 31.46 | 39.27 | 48.41 | 56.95 | 65.48 | 76.50 | 83.41 | 91.68 |
| Air pressure [bar] | 3.0 | 3.0381 | 3.0829 | 3.1306 | 3.1815 | 3.2332 | 3.2858 | 3.3393 | 3.3916 | 3.4455 | 3.5001 |

FREIGHT WEIGHT ESTIMATING APPARATUS AND METHOD

CROSS REFERENCE TO RELATED APPLICATIONS

This application claims priority to and the benefit of Korean Patent Application No. 10-2021-0092682 filed in the Korean Intellectual Property Office on Jul. 15, 2021, the entire contents of which are incorporated herein by reference.

BACKGROUND

(a) Field

The present disclosure relates to a freight weight estimating apparatus and method, and more particularly, to a freight weight estimating apparatus and method that may estimate weight of loaded freight by using a tire pressure monitoring system.

(b) Description of the Related Art

Generally, when loading freight in a vehicle such as a van or a truck, a driver does not accurately grasp weight of the freight loaded in the vehicle, thereby violating the law, or accidents frequently occur due to overloading while driving the vehicle.

However, in the prior art, it is a reality that the weight of the freight loaded in the vehicle may not be accurately measured or predicted and provided to the driver.

Therefore, by providing the driver with the weight of the freight loaded in the vehicle, it is possible for the driver to comply with laws and regulations and to prevent accidents due to overload in advance.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide a freight weight estimating apparatus and method that may provide a driver with weight of freight loaded in a vehicle.

An embodiment of the present disclosure provides a freight weight estimating apparatus, including a TPMS sensor that measures an air pressure of a tire, and a controller that calculates a first tread area of the tire from a first air pressure of the tire measured by the TPMS sensor before loading freight, calculates a second tread area of the tire from a second air pressure of the tire measured by the TPMS sensor after loading the freight, and estimates a weight of the freight loaded in a vehicle based on the first tread area and the second tread area.

In the controller, a relationship between the weight of the freight, the air pressure of the tire, and the tread area of the tire may be stored as tabulated map data.

The controller may calculate the first tread area according to the first air pressure and the second tread area according to the second air pressure from the map data.

The controller may calculate a first weight of freight corresponding to the first tread area and a second weight of freight corresponding to the second tread area from the map table, and may calculate a weight of the freight loaded in the vehicle from the first weight and the second weight.

The freight weight estimating apparatus may further include a display device that provides a value of the weight of the freight loaded in the vehicle to a driver.

Another embodiment of the present disclosure provides a freight weight estimating method, including measuring a first air pressure of a tire before loading freight, measuring a second air pressure of the tire after loading the freight, calculating first and second tread areas of the tire corresponding to the first air pressure and the second air pressure, and estimating a weight of freight loaded in a vehicle based on the first and second tread areas of the tire.

A relationship between the weight of the freight, the air pressure of the tire, and the tread area of the tire may be stored as tabulated map data.

The first tread area according to the first air pressure and the second tread area according to the second air pressure may be calculated from the map data.

A first weight of freight corresponding to the first tread area and a second weight of freight corresponding to the second tread area may be calculated from the map table, and a weight of the freight loaded in the vehicle may be calculated from the first weight and the second weight.

The freight weight estimating method may further include providing a value of the weight of the freight loaded in the vehicle to a driver.

According to the freight weight estimating apparatus according to the embodiment of the present disclosure as described above, it is possible to estimate weight of freight loaded in a vehicle by using a tire pressure monitoring system typically provided in the vehicle.

In addition, by providing a driver with weight of freight loaded in a vehicle, it is possible to prevent an accident in advance by preventing overload, and to induce the driver to comply with laws and regulations.

BRIEF DESCRIPTION OF THE FIGURES

These drawings are for reference only in describing embodiments of the present disclosure, and therefore, the technical idea of the present disclosure should not be limited to the accompanying drawings.

FIG. 3 illustrates a table of a relationship between weight of freight loaded in a vehicle and a tread area of a tire according to an embodiment of the present disclosure.

DETAILED DESCRIPTION

Figure 1:
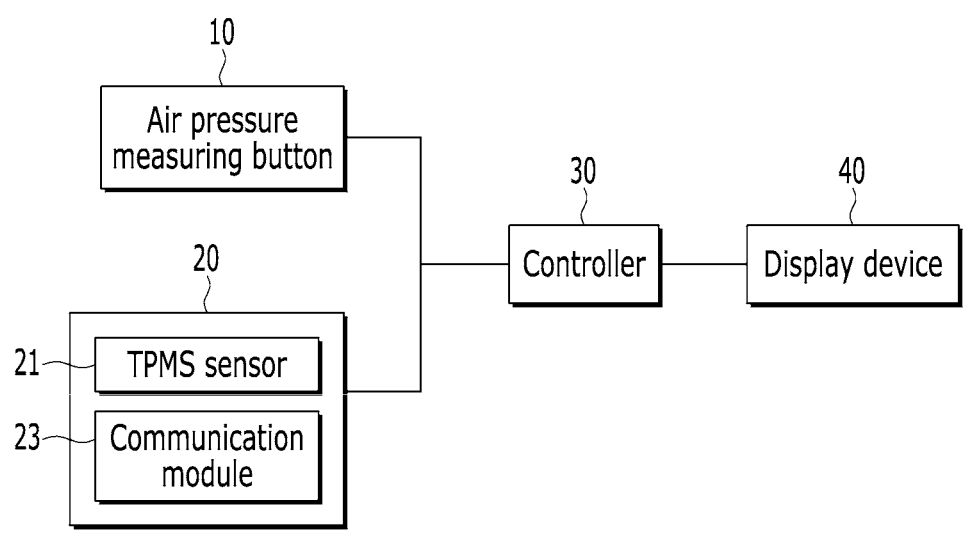
FIG. 1 illustrates a block diagram of a freight weight estimating apparatus according to an embodiment of the present disclosure.

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

In order to clearly describe the present disclosure, parts that are irrelevant to the description are omitted, and identical or similar constituent elements throughout the specification are denoted by the same reference numerals.

In addition, since the size and thickness of each configuration shown in the drawings are arbitrarily shown for convenience of description, the present disclosure is not necessarily limited to configurations illustrated in the drawings, and in order to clearly illustrate several parts and areas, enlarged thicknesses are shown.

In the specification of the present disclosure, the terms "-er", "-or", "unit", "portion", "part", and "module" described in the specification mean units for processing at least one function and operation, and can be implemented by hardware components or software components and combinations thereof.

In the specification of the present disclosure, a controller 30 is composed of hardware including at least one processor, memory, communication apparatus, etc., and a program executed in combination with hardware is stored in a designated location. The hardware has a configuration and performance to implement a method of the present disclosure. The program includes instructions that implement the method of operation of the present disclosure described with reference to the drawings, and executes the present disclosure in combination with hardware such as a processor and a memory.

Hereinafter, a freight weight estimating apparatus according to an embodiment of the present disclosure will be described in detail with reference to the accompanying drawings.

FIG. 1 illustrates a block diagram of a freight weight estimating apparatus according to an embodiment of the present disclosure.

As shown in FIG. 1, a freight weight estimating apparatus according to an embodiment of the present disclosure may include a tire pressure monitoring system (TPMS) 20, and a controller 30 that estimates weight of freight loaded in a vehicle based on a tire pressure detected by the tire pressure monitoring system 20.

The tire pressure monitoring system 20 may include a TPMS sensor 21 installed in each tire and measuring a pressure of the tire, and a communication module 23 for transmitting the pressure of each tire measured by the TPMS sensor 21 to the controller 30.

The controller 30 estimates the weight of the freight loaded in the vehicle based on the pressure of each tire measured by the TPMS sensor 21.

The freight weight estimating apparatus according to the embodiment of the present disclosure may include an air pressure measuring button 10 that is operated by a driver to instruct to measure the tire pressure through the TPMS sensor 21. When the driver presses the air pressure measuring button 10, the TPMS sensor 21 measures a tire air pressure, and the tire air pressure measured by the TPMS sensor 21 is transmitted to the controller 30.

When the driver presses the air pressure measuring button 10 before loading the freight in the vehicle, the TPMS sensor 21 measures a tire air pressure (a first air pressure) before loading the freight in the vehicle to transmit it to the controller 30. In addition, when the driver presses the air pressure measuring button 10 after loading the freight in the vehicle, the TPMS sensor 21 measures a tire air pressure (a second air pressure) after loading the freight in the vehicle to transmit it to the controller 30.

The controller 30 may estimate the weight of the freight loaded in the vehicle based on a tire tread area (first tread area) according to the first air pressure measured by the TPMS sensor 21, and a tire tread area (second tread area) according to the second air pressure measured by the TPMS sensor 21.

To this end, the controller 30 may be provided as at least one processor executed by a predetermined program, and the predetermined program is configured to perform respective steps of a freight weight estimating method according to an embodiment of the present disclosure.

The freight weight estimating apparatus according to the embodiment of the present disclosure may further include a display device 40 for displaying the air pressure of the tire measured by the TPMS sensor 21, and the weight of the freight estimated by the controller 30. The display device 40 may be implemented through a center fascia or a cluster provided in the vehicle.

As necessary, the air pressure measuring button 10 may be implemented through the display device 40, and in this case, the display device 40 may function as an input device as well as a display device for displaying the tire air pressure and the weight of the freight.

Hereinafter, an operation of the weight estimating apparatus of the loaded freight according to the embodiment of the present disclosure as described above will be described in detail with reference to the accompanying drawings.

Figure 2:
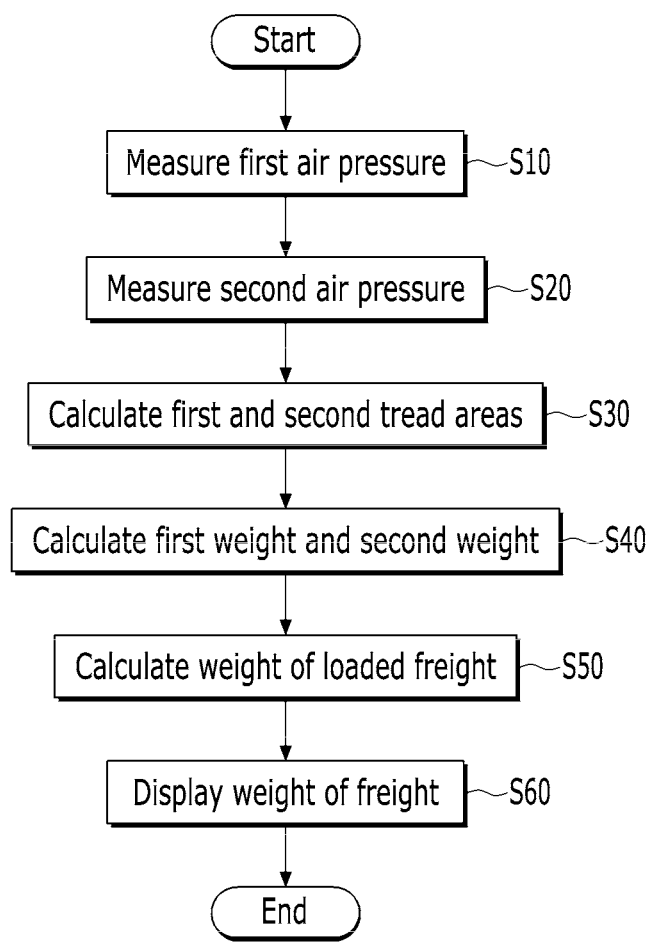
FIG. 2 illustrates a flowchart of a freight weight estimating method according to an embodiment of the present disclosure.

FIG. 2 illustrates a flowchart of a freight weight estimating method according to an embodiment of the present disclosure.

As shown in FIG. 2, when the driver presses the air pressure measuring button 10 before loading the freight into the vehicle, the TPMS sensor 21 measures the tire air pressure (first air pressure) at S10, and the tire air pressure (first air pressure) measured by the TPMS sensor 21 is transmitted to the controller 30. That is, the driver instructs to measure the tire air pressure (first air pressure) before loading the freight in the vehicle through the air pressure measuring button 10, and the TPMS sensor 21 measures the tire air pressure (first air pressure) before loading the freight in the vehicle to transmit it to the controller 30.

In this case, the tire air pressure (first air pressure) before loading the freight in the vehicle may be provided to the driver through the display device 40.

When the driver presses the air pressure measuring button 10 after loading the freight into the vehicle, the TPMS sensor 21 measures the tire air pressure (second air pressure) at S20, and the tire air pressure (second air pressure) measured by the TPMS sensor 21 is transmitted to the controller 30.

Meanwhile, in the controller 30, a relationship between the weight of the freight loaded in the vehicle, the tire air pressure, and the tread area of the tire may be stored in advance in a tabulated map data format (refer to FIG. 3).

The controller 30 calculates a first tread area of the tire corresponding to the first air pressure from the map table, and calculates a second tread area of the tire corresponding to the second air pressure at S30.

The controller 30 calculates a first weight of freight corresponding to the first tread area from the map table, and calculates a second weight of freight corresponding to the second tread area at S40.

The controller 30 calculates the weight of the freight loaded in the vehicle from the first weight and the second weight at S50. That is, the controller 30 may estimate a difference between the second weight and the first weight as the weight of the freight loaded in the vehicle.

The controller 30 may provide the calculated weight of the freight to the driver through the display device at S60.

A weight estimating method of freight loaded in a vehicle will be described as an example with reference to FIG. 3.

In FIG. 3, a vertical axis indicates tire air pressure values, and a horizontal axis indicates weight values of the freight loaded in the vehicle. In addition, tread area values (surface area of contact with ground) of the tire according to the tire air pressure values and the weight values of the freight are indicated. The map data of FIG. 3 may be previously determined by an experiment, and specific data may be changed according to a specification of a tire or a vehicle.

Referring to FIG. 3, for when the tire air pressure is 1 bar in a state in which no freight is loaded, a case in which freight is loaded in the vehicle will be described as an example.

When the first air pressure measured by the TPMS sensor 21 is 1.0243 bar, the first tread area of the tire is 20.6 cm$^2$. In this case, when the first tread area of the tire is 20.6 cm$^2$, it can be seen that the first weight of the freight loaded in the vehicle is 50 kg.

In addition, when the second air pressure measured by the TPMS sensor 21 is 1.0291 bar, the second tread area of the tire is 171.56 cm$^2$. In this case, when the second tread area of the tire is 171.56 cm$^2$, it can be seen that the second weight of the freight loaded in the vehicle is 500 kg.

Accordingly, it can be estimated that the weight of the freight loaded in the vehicle is 450 kg from a difference between the second weight (500 kg) and the first weight (50 kg).

According to the freight weight estimating apparatus and method according to the embodiment of the present disclosure as described above, it is possible to easily estimate the weight of the freight loaded in the vehicle by using the tire pressure monitoring system 20 provided in the vehicle.

In addition, by providing the weight value of the freight to the driver, it is possible to prevent overload in advance and induce compliance with laws and regulations.

The above-described embodiments can be realized through a program for realizing functions corresponding to the configuration of the embodiments or a recording medium for recording the program in addition to through the above-described device and/or method, which is easily realized by a person skilled in the art.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

The invention claimed is:

1. A freight weight estimating apparatus, comprising:
   a TPMS sensor configured to measure air pressure of a tire; and
   a controller configured
      to calculate a first tread area of the tire from a first air pressure of the tire measured by the TPMS sensor before loading freight,
      to calculate a second tread area of the tire from a second air pressure of the tire measured by the TPMS sensor after loading the freight, and
      to estimate a weight of the freight loaded in a vehicle based on the first tread area and the second tread area,
   wherein in the controller, a relationship between the weight of the freight, the first air pressure of the tire, and the first tread area of the tire is stored as tabulated map data,
   wherein the controller is configured to calculate the first tread area according to the first air pressure and the second tread area according to the second air pressure from the map data, and
   wherein the controller is configured to calculate a first weight of freight corresponding to the first tread area and a second weight of freight corresponding to the second tread area from the map data, and to calculate the weight of the freight loaded in the vehicle from the first weight and the second weight.

2. The freight weight estimating apparatus of claim 1, further comprising a display device configured to provide a value of the weight of the freight loaded in the vehicle to a driver.

3. A freight weight estimating method, comprising:
   measuring, via a controller, a first air pressure of a tire before loading freight;
   measuring a second air pressure of the tire after loading the freight;
   calculating a first tread area of the tire corresponding to the first air pressure,
   calculating a second tread area of the tire corresponding to the second air pressure; and
   estimating a weight of freight loaded in a vehicle based on the first and second tread areas of the tire,
   wherein a relationship between the weight of the freight, the first air pressure of the tire, and the first tread area of the tire is stored as tabulated map data,
   wherein the first tread area according to the first air pressure and the second tread area according to the second air pressure are calculated from the map data, and
   wherein a first weight of freight corresponding to the first tread area and a second weight of freight corresponding to the second tread area are calculated from the map data, and a weight of the freight loaded in the vehicle is calculated from the first weight and the second weight.

4. The freight weight estimating method of claim 3, further comprising providing a value of the weight of the freight loaded in the vehicle to a driver.

* * * * *